United States Patent
Keoh et al.

(10) Patent No.: US 9,092,643 B2
(45) Date of Patent: Jul. 28, 2015

(54) SECURE ACCESS TO PERSONAL HEALTH RECORDS IN EMERGENCY SITUATIONS

(75) Inventors: Sye Loong Keoh, Eindhoven (NL); Muhammad Asim, Eindhoven (NL); Sandeep Shankaran Kumar, Eindhoven (NL); Petrus Johannes Lenoir, 's Hertogenbosch (NL)

(73) Assignee: Koninklijke Philips N.V., Eindhoven (NL)

( * ) Notice: Subject to any disclaimer, the term of this patent is extended or adjusted under 35 U.S.C. 154(b) by 37 days.

(21) Appl. No.: 13/981,735

(22) PCT Filed: Jan. 30, 2012

(86) PCT No.: PCT/IB2012/050420
§ 371 (c)(1),
(2), (4) Date: Jul. 25, 2013

(87) PCT Pub. No.: WO2012/104771
PCT Pub. Date: Aug. 9, 2012

(65) Prior Publication Data
US 2013/0318632 A1  Nov. 28, 2013

(30) Foreign Application Priority Data
Feb. 1, 2011 (EP) .................................. 11152826

(51) Int. Cl.
*G06F 21/62* (2013.01)
*G06F 21/10* (2013.01)
(Continued)

(52) U.S. Cl.
CPC ............ *G06F 21/6245* (2013.01); *G06F 21/10* (2013.01); *H04L 9/0897* (2013.01);
(Continued)

(58) Field of Classification Search
CPC ... G06F 21/10; G06F 21/6245; H04L 63/123; H04L 63/0428; H04L 63/0807; H04L 63/0876; H04L 9/0897

USPC .......................................................... 726/28
See application file for complete search history.

(56) References Cited

U.S. PATENT DOCUMENTS 7,788,728 B2 * 8/2010 Kim et al. ....................... 726/30
2003/0233342 A1 12/2003 Vadrot et al.
(Continued)

FOREIGN PATENT DOCUMENTS

JP  2000191902 A  7/2000
JP  2002007562 A  1/2002
(Continued)

OTHER PUBLICATIONS

Kunzi, J. "Emergency Access to Protected Health Records". Medical Informatics in a United and Healthy Europe, 2009 European Federation for Medical Informatics. pp. 705-709.
(Continued)

*Primary Examiner* — Dant Shaifer Harriman

(57) ABSTRACT

A system including a server system, a user terminal and a hardware token, for providing secure access to a data record. The server system comprises storage means (1) for storing a plurality of data records, a data record (2) having associated therewith a sequence of secrets (14) shared with a hardware token (60) corresponding to the data record (2), the server system (100) further being arranged for storing user authentication information (3). User authenticating means (10) are provided for receiving authentication credentials (11) of a user from a user terminal (200) and authenticating the user as an authorized user, based on the authentication credentials (11) of the user and the stored authentication information (3). Secret-receiving means (9) are provided for receiving a representation of a secret (13) revealed by a hardware token (60) and information identifying the data record corresponding to the hardware token from the terminal. Marking means (12) are provided for marking the unused secret ($s_3$) as used.

20 Claims, 4 Drawing Sheets

(51) Int. Cl.
*H04L 29/06* (2006.01)
*H04L 9/08* (2006.01)

(52) U.S. Cl.
CPC ........ *H04L63/0428* (2013.01); *H04L 63/0807* (2013.01); *H04L 63/0876* (2013.01); *H04L 63/123* (2013.01); *G06F 2221/0711* (2013.01); *G06F 2221/0753* (2013.01); *G06F 2221/0755* (2013.01); *G06F 2221/2137* (2013.01); *G06F 2221/2153* (2013.01); *H04L 2209/88* (2013.01)

(56) References Cited

U.S. PATENT DOCUMENTS

| | | |
|---|---|---|
| 2007/0078686 A1 | 4/2007 | Dettinger et al. |
| 2007/0250704 A1 | 10/2007 | Hallam-Baker |
| 2008/0178298 A1* | 7/2008 | Arai et al. .......... 726/29 |

FOREIGN PATENT DOCUMENTS

| | | | | |
|---|---|---|---|---|
| WO | 2007030605 A2 | | 9/2006 | |
| WO | WO2007/030605 | * | 3/2007 | ............. G06Q 20/00 |

OTHER PUBLICATIONS

Uckert, F. et al. "Implementing Security and Access Control Mechanisms for An Electronic Healthcare Record". AMIA 2002 Annual Symposium Proceedings. Muenster, Germany.

ICER-2-GO product details are given in ICER-2-GO.pdf. The video is available at http://www.screencast.com/users/ClinicPro/folders/ICER-2-GO/media/58d1574c-af8c-477a-b232-53ca37741163.

AccessMyRecord-In Case of Emergency (AMR-ICE), http://www.accessmyrecords.com.

Microsoft HealthVault, http://www.healthvault.com/.

Google Health, www.google.com/health/.

Abelson, H. et al. "The Risks of Key Recovery, Key Escrow, and Trusted Third Party Encryption". Center for Democracy and Technology. Washington, DC. World Wide Web Digital Issue No. 3, Jun. 1998, pp. 241-257.

Haller, N. "The S/key one-time password system". Internet citation Dec. 30, 2004, pp. 1-7 xp002485098 retrieved from internet http://zoo.cs.yale.edu/classes/cs422/2010/bib/haller94skey.pdf.

Lamport, L. "Password Authentication with Insecure Communication". Communications of the ACM, Nov. 1981, vol. 24, No. 11, pp. 770-772.

Sandhu, R. et al. "Role-Based Access Control Models". IEEE Computer, 29(2):38-47, Feb. 1996.

http://www.smartcardalliance.org/resources/pdf/German_Health_Card.pdf.

* cited by examiner

SECURE ACCESS TO PERSONAL HEALTH RECORDS IN EMERGENCY SITUATIONS

FIELD OF THE INVENTION

The invention relates to providing secure access to a data record.

BACKGROUND OF THE INVENTION

There is a growing need for a systematic management of health-related and/or medical data. Diagnostic reports from different hospitals or clinics, prescriptions, medication consumption logs, etc may be kept securely and access to such medical data may be made convenient for the user. Such a health data management application may be used, for example, for patients who suffer from chronic diseases and the elderly, who tend to be forgetful and require assistance in managing their health records. Recently, the concept of Personal Health Record (PHR) that can be managed by the users themselves has been proposed. Such a PHR can be used for storing and controlling access to the users' health data. Electronic Medical Records (EMR) and Electronic Health Records (EHR) from hospital can be imported into the user's PHR, allowing ubiquitous access to the user's health data whenever an Internet connection is available.

By the default, access to the PHR is only permitted to the users themselves. However, the users can also define an access control list or other access control mechanisms. For example, Julien Kunzi, Paul Koster Milan Petkovic, Emergency Access to Protected Health Records, in K.-P. Adlassnig et al. (Eds.): Medical Informatics in a United and Healthy Europe, MIE 2009, IOS Press, 2009, pp. 705-709, hereinafter: Kunzi et al, discloses granting access to a user's family members, friends and relatives. Also, the elderly may delegate the task of managing their medical records by granting full permission to a family member who is more competent. Such pre-defined access control policies fall short when a doctor or ambulance team intends to provide treatment to an unconscious user in an emergency situation. The emergency doctor and the ambulance team will not be able to access the user's PHR because the user is not capable of providing his password and the access control policy may not allow unauthorized individuals access to the data. However, it would be beneficial if some background information about the user's health condition can be provided while he is being treated in the event of emergency. Research has shown that many fatal errors could have been avoided if the doctor had had access to information about the patient before emergency treatment.

Künzi et al. discloses sending an access request by an emergency doctor, indicating that this is an emergency override. Access is granted and then logged if the requesting entity has the appropriate credentials, i.e., the requesting entity is a certified medical doctor. Subsequently, the access log is used for post-access auditing to determine whether access to the user's health data is legitimate. However, such mechanism is ineffective as it infringes the user's health data privacy rights if the emergency override was malicious. Essentially, auditing is not a preventive measure to prevent malicious access to the PHR.

In an emergency situation, because the user is unconscious, he is not able to provide his password to enable accessing the PHR. Thus, this triggers the need for emergency access to the user's PHR. However, it is difficult for the PHR Server to distinguish between a genuine emergency situation and a malicious attempt to access the PHR, because in both cases, the user is unavailable.

"Implementing Security And Access Control Mechanisms For An Electronic Healthcare Record", Frank K. Uckert et al, AMIA 2002 Annual Symposium Proceedings, discloses a system in which the user can provide read access to an emergency subset of his EHR by enabling and defining this within his record. When this feature is enabled, an emergency TAN is created. The combination of web address, username and this emergency TAN printed on a small wallet card can be taken along by the patient and used by any other person in cases of an emergency for this patient. With TAN (transaction numbers) a user is able to give access to parts of his record to anybody for only one session. The principle of the TAN is similar to the one known from international online banking. After one usage the TAN is invalid. A new TAN can be produced by the user whenever necessary.

SUMMARY OF THE INVENTION

It would be advantageous to have an improved system for providing secure access to a data record. To better address this concern, a first aspect of the invention provides a server system comprising:

storage means for storing a plurality of data records, a data record having associated therewith a sequence of secrets shared with a hardware token corresponding to the data record, the server system further being arranged for storing a plurality of authentication credentials for users;

user authenticating means for receiving authentication credentials of a user from a user terminal and authenticating the user as a user of the server system, based on the authentication credentials of the user;

secret-receiving means for receiving a representation of a secret revealed by a hardware token and information identifying the data record corresponding to the hardware token from the terminal;

matching means for matching the representation of the secret with an unused secret in the sequence of secrets associated with the data record corresponding to the hardware token;

access granting means for granting the user access to at least part of the data record corresponding to the hardware token if the representation of the secret matches the unused secret and the user has been authenticated as a user of the server system; and marking means for marking the unused secret as used.

The server system may provide improved security. The user authentication means ensures that only authorized persons can get access to the data record. For example, only emergency workers are given authorization credentials (optionally these credentials are made valid only during their working shifts). Moreover, the secret-receiving means and matching means are used to identify the data record and to provide evidence that the user has a professional need to access the data record, because otherwise the user would not have possession of the hardware token with the representation of the secret on it. The combination of user authentication and a representation of a secret received from a hardware token provides improved security, because without the user authentication, whoever finds or steals the card can access the data record.

Because the hardware token can produce representations of a sequence of secrets, the hardware token can be used multiple times. Each secret grants only one-time access to the data record, because only unused secrets are valid.

The server system may comprise a communication means for making an automated telephone call or sending a message to a mobile phone or mobile terminal of a person associated with the hardware token before the access granting means grants the user access, and wherein the communication means is arranged for enabling the person to refuse granting access. For example, the person may refuse to grant access by pressing a button on the telephone during the automated telephone call or by sending a return message. This way, it is tested whether the person is conscious. If the person does not answer the call or does not return a message, this may be because the person is unconscious, and the system will then allow access to the data record.

The access granting means may comprise an encrypter for encrypting the at least part of the data record, using a key based on a value received from the user terminal, and transmitting the encrypted data and information to compute the key from the value to the user terminal. This way, it may be ensured that only the user terminal can decrypt the data.

The access granted to the at least one of the data records may be limited in time. This way, it is avoided that the data record can be reviewed when the emergency situation is no longer there.

The representation of the secret may comprise an encryption of the secret, and the encryption may be based on a key, and the key may be part of a hash sequence, and the position of the secret in the sequence of secrets may correspond to a position of the key in the hash sequence. This way, each secret in the sequence is differently encrypted. Both the token and the server system may use the same sequence of keys. The server system does not need to store the complete sequence of encrypted keys because they can be re-computed by means of the hash sequence.

The server system may comprise data transmission means arranged for transmitting the key in the hash sequence corresponding to the position of the secret in the sequence of secrets to the user terminal. By applying the hash function, the user terminal or the hardware token may compute one or more of the further keys in the hash sequence. The user terminal or token may compare these computed values with a stored one. For example, a final key in the hash chain is stored on the hardware token before the hardware token is issued. This provides an authentication of the server or provides a way in which the terminal can verify that the correct data record is obtained.

In another aspect, the invention provides a hardware token. This hardware token may be used with a user terminal in communication with the server system set forth. The hardware token may comprise secret-providing means for providing a representation of a secret, wherein the representation of the secret comprises an encryption of the secret, and the encryption is based on a key, and the key is part of a hash sequence, and the position of the secret in the sequence of secrets corresponds to a position of the key in the hash sequence, and the secret-providing means is arranged for providing the representations in reverse sequential order. The sequence of representations may be stored on a storage means of the hardware token.

In another aspect, the invention provides a user terminal for use with the server system. The user terminal comprises a secret receiver for receiving a representation of a secret revealed by a hardware token and information identifying the data record corresponding to the hardware token;

a credentials receiver for receiving authentication credentials of a user;

a value generator for generating a value;

a transmitter for transmitting the authentication credentials of the user, the representation of the secret revealed by the hardware token, information identifying the data record corresponding to the hardware token, and the generated value to a server system; and a data receiver for receiving at least part of the contents of the data record in encrypted form and key data from the server system;

a key computing means for computing a key, based on the value and the key data; and a data decrypter for decrypting the at least part of the content of the data record, based on the key.

The user terminal provides improved security by means of the user credentials and the secret from the hardware token. Moreover, the data record is protected by encryption, wherein the key does not need to be transmitted over the network.

The secret receiver may comprise a token reader for electronically obtaining the representation or the information from the hardware token.

A system for providing secure access to a data record may comprise the server system, a plurality of hardware tokens, and a plurality of user terminals. The hardware tokens may be carried by persons, such as potential patients, and the user terminals may be carried or used by users, such as emergency workers. When a person needs help and cannot provide access details of his or her personal health record, the emergency worker may connect the hardware token with the terminal and the terminal may transmit a representation of a secret to the server system; the emergency worker authenticates him or herself with the server system, and gets access to an emergency portion of the personal health record of the person. The next time the person needs emergency assistance, the hardware token may produce a next representation of a secret.

In another aspect, the invention provides a method of providing secure access to a data record. The method comprises storing a plurality of data records, a data record having associated therewith a sequence of secrets shared with a hardware token corresponding to the data record, and a plurality of authentication credentials for users on a server system;

receiving authentication credentials of a user from a user terminal and authenticating the user as a user of the server system, based on the authentication credentials of the user;

receiving a representation of a secret revealed by a hardware token and information identifying the data record corresponding to the hardware token from the terminal;

matching the representation of the secret with an unused secret in the sequence of secrets associated with the data record corresponding to the hardware token, granting the user access to at least part of the data record corresponding to the hardware token if the representation of the secret matches the unused secret and the user has been authenticated as a user of the server system; and marking the unused secret as used.

In another aspect, the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful.

Modifications and variations of the server system, the user terminal, the hardware token, the method, and/or the computer program product, which correspond to the described modifications and variations of the other aspects of the invention, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

The present description describes embodiments of a system that can be used to provide access to a medical record of a person in case of an emergency, such as when a person becomes unconscious because of an accident or a cardiac arrest. The person may carry a hardware tag, which would be treated by the person in a way similar to a credit card. The information stored on the hardware tag is kept secret. The hardware tag can have the secret information stored thereon in electronic form, such that the information is only revealed when the hardware tag is connected to a tag reader. Alternatively, the information may be made visible, so the person who needs to get access to the data record may copy the information into a terminal. When the user is unconscious, the doctor can get hold of the hardware tag and use the information on it to request a one-time emergency access to the person's personal health record stored on a personal health record (PHR) server. In case the data tag is stolen or lost, the user can report the loss in order to disable any emergency access to the PHR by blocking the hardware tag on the server.

As a countermeasure against theft, the possession of the data tag does not necessarily mean that the requesting entity has emergency access to the user's PHR. Policies may be defined in the PHR Server to allow only certified doctors or medical personnel who can provide information from the data tag to trigger emergency access. Similarly, the doctor who does not have the information from the data tag is not authorized to initiate the emergency access.

Additionally, a one-time session key may be provided by the hardware tag for use by the emergency doctor to access the user's PHR, based on a key from the user's hash chain known only to the PHR server and a secret from the doctor. The doctor is also able to ascertain whether the PHR received from the PHR server is authentic and that it corresponds to the identity of the user.

Figure 1:
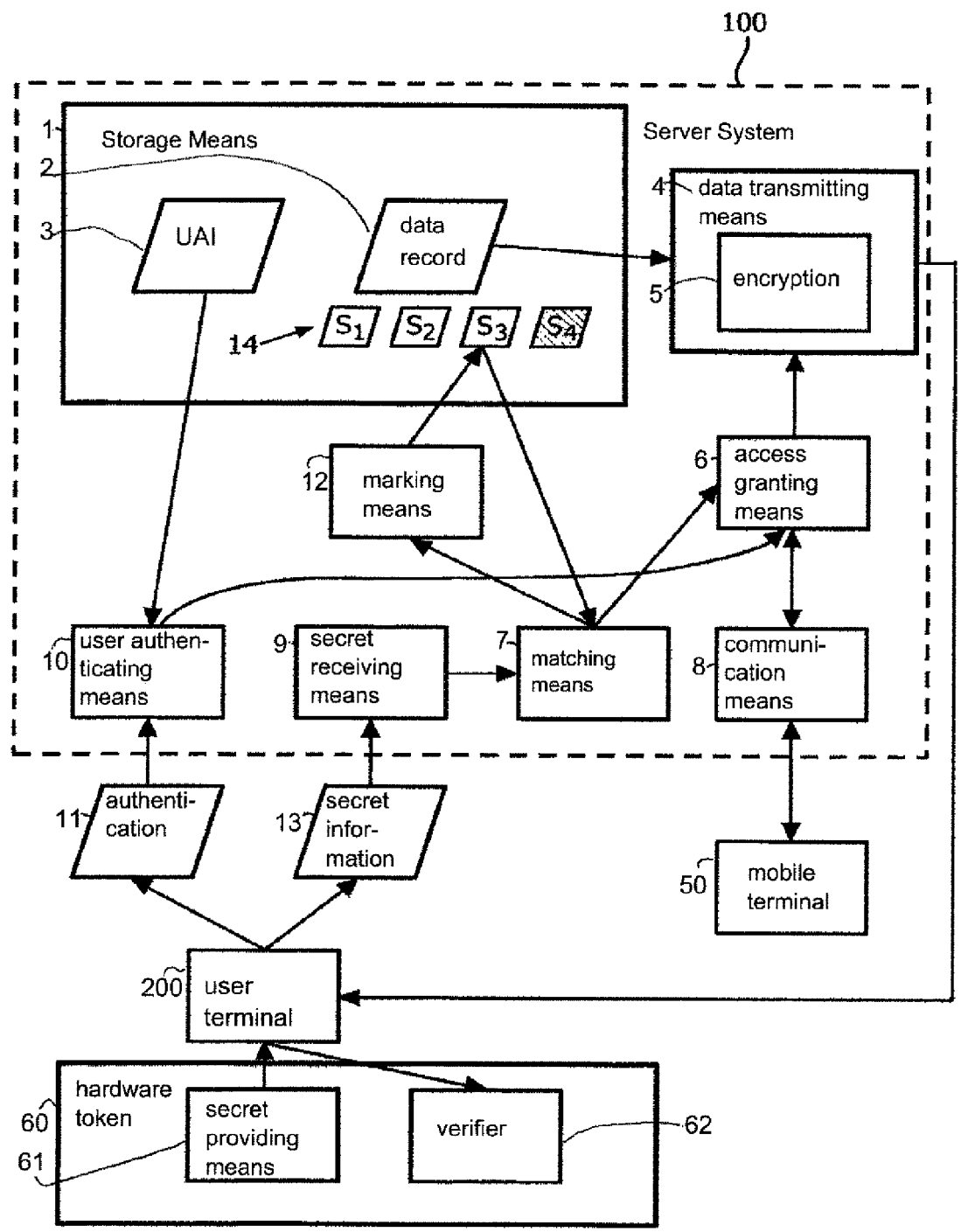
FIG. 1 is a block diagram of a system for providing secure access to a data record.

FIG. 1 illustrates a system including a server system 100, a user terminal 200, and a hardware token 60. The system may be used to provide secure access to a data record 2. The server system 100 may be implemented using a plurality of computers and storage media. The system may also be implemented on a smaller scale, using only a single computer. Other implementation possibilities will be apparent to the skilled person in view of the present description.

The storage means 1 of the server system may be configured for storing a plurality of data records, such as personal health records. The figure illustratively shows one data record 2. Each data record 2 for which the possibility of emergency access is enabled may have a corresponding hardware token 60 to be carried by the person to whom the data record 2 relates. Such data record 2 may also have associated therewith a sequence of secrets 14 shared with the hardware token 60 corresponding to the data record 2. In the illustration, four secrets $s_1, s_2, s_3, s_4$ in the sequence of secrets 14 have been illustrated by way of example.

Also, server system 100 may be arranged for storing user authentication information 3. Such user authentication information may include an access control policy. The user referred to may be a physician or an emergency worker, or another person who has a valid reason, or is authorized, to access the data record.

The server system 100 may further comprise user authenticating means 10 for receiving authentication credentials 11 of a user from a user terminal 200. Based on the received authentication credentials 11 and the stored authentication information 3, the user authentication means 10 decides whether the user at the terminal 200 may generally access emergency data of data records stored by the server system 100. In other words, the user authenticating means is arranged for authenticating the user as an authorized user. The authentication means 10 may be arranged for performing role-based access control or attribute-based access control, for example based on the stored access control policy. Role-based or attribute-based access control is known in the art per se. In the server system 100, such a policy may allow a user having a particular set of attributes associated therewith access to the data record only when the user also provides appropriate secret information 13 obtained from a hardware token 60, as discussed below. The secret information 13 may be read from the hardware token 60 and forwarded to the server 100 by the terminal 200 under control of the user.

The server system 100 further may comprise secret-receiving means 9 for receiving a representation of a secret 13 from the terminal 200. The terminal 200 may be arranged for reading the secret 13 from a hardware token 60 of the person to whom the data record 2 relates. Moreover, information identifying the data record corresponding to the hardware token may be received. This latter information may be included in the secret or it may be a separate piece of data obtained from the token or otherwise.

The server system 100 may further comprise matching means 7 for matching the representation of the secret 13 with an unused secret in the sequence of secrets associated with the data record 2 corresponding to the hardware token 60. In the figure, $S_1, S_2$, and $S_3$ are unused secrets and $S_4$ is a used secret. For example, the matching means 7 may match the received representation of the secret 13 with the last unused secret $S_3$ in the sequence of secrets 14.

The server system 100 may further comprise access granting means 6 for granting the user access to at least part of the data record 2 corresponding to the hardware token 60 if the representation of the secret 13 matches the unused secret $S_3$ and the user has been authenticated as an authorized user. If these two conditions are not both met, the access granting means 6 may refuse the access to the data record 2.

The server system 100 may further comprise marking means 12 for marking the unused secret $S_3$ as used. This way, the system keeps track of which secrets are still unused (e.g., $S_1$ and $S_2$). Only representations 13 of unused secrets may be used to get access to the data record 2.

The server system may comprise a communication means 8 for making an automated telephone call or sending a message to a mobile terminal 50, such as a mobile phone, of a person associated with the hardware token 60. For example, the communication means 8 may comprise communication hardware found in mobile phones or a network connection with such communication hardware. The communication means 8 performs its task before the access granting means 6 grants the user access. The communication means 8 is capable of a bidirectional communication. If the communication means 8 receives an appropriate signal back from the mobile terminal 50, the communication means 8 may send a signal to the access granting means 6 to instruct the access granting means 6 to refuse access to the data record 2. The mobile terminal 50 comprises a user interface enabling the user to transmit the appropriate signal, such as a DTMF tone or an sms message.

The server system 100 may comprise an encrypter 5 for encrypting the at least part of the data record 2, using a key based on a value received from the user terminal. This value may be transmitted from the user terminal together with the representation of the secret 13. The server system 100 may further comprise a data transmiting means 4 for transmitting the encrypted data and information to compute the key from the value to the user terminal. The data transmission means 4 may send the complete accessible portion of the data record to the terminal 200, and the terminal 200 may comprise software enabling the user to browse the data. Alternatively, the data transmission means 4 may comprise a web server, which sends the elements of the data record 2 requested by the user via the terminal 200 and a web interface. The transmitting means 4 does not need to be based on the key computations described above. Instead or additionally, for example, SSL and/or HTTPS encryption technology or other data protection protocols may be employed.

The server system 100 may be arranged for granting access to the data record 2 only for a limited time after having received the representation of the secret 13. For example, access is allowed during only one session and/or during a predetermined period of time. For example, only for one hour. Alternatively or additionally, the data record 2 may be transmitted to the user terminal 200 only once or only a predetermined number of times.

The representation of the secret 13 may comprise an encryption of the secret (for example an encryption of S3). The encryption is based on a key, and the key may be part of a hash sequence. A hash sequence is a sequence in which each successive element is obtained by applying a hash function to the previous element. The position of the secret in the sequence of secrets corresponds to a position of the key in the hash sequence. In other words, each successive secret is encrypted with the next key in the hash sequence. This way, when revealing the keys one by one starting with the last key in the hash sequence and working backwards, it is difficult for an attacker to break the unrevealed keys. This is so because the hash function is a one-way function.

FIG. 1 also shows a hardware token 60 for use with a user terminal 200 in communication with the server system 100. The hardware token 60 comprises secret-providing means 61 for providing a representation of a secret 13 to the terminal 200. The representation of the secret 13 may comprise an encryption of the secret. The encryption may be based on a key, and the key may be part of a hash sequence, and the position of the secret in the sequence of secrets may correspond to a position of the key in the hash sequence, and the secret-providing means may be arranged for providing the representations in reverse sequential order.

The hardware token may comprise a verifier 62 arranged for receiving the key with which the encryption of the secret was generated. This key is referred to as the 'received key'. The received key may be transmitted from the server system 100 to the terminal 200 and forwarded by the terminal to the hardware token 60. The verifier 62 may apply a hash function to the received key. In this way, a processed key is generated. This processed key, which may be subjected to further processing steps, may be compared to a stored value. The stored value is based on a further key in the hash sequence. After the comparison, a result of the comparison may be sent to the terminal. If the comparison does not result in a match, the terminal may generate an error, because there is a mismatch between the data record on the server system and the information on the hardware token.

Figure 2:
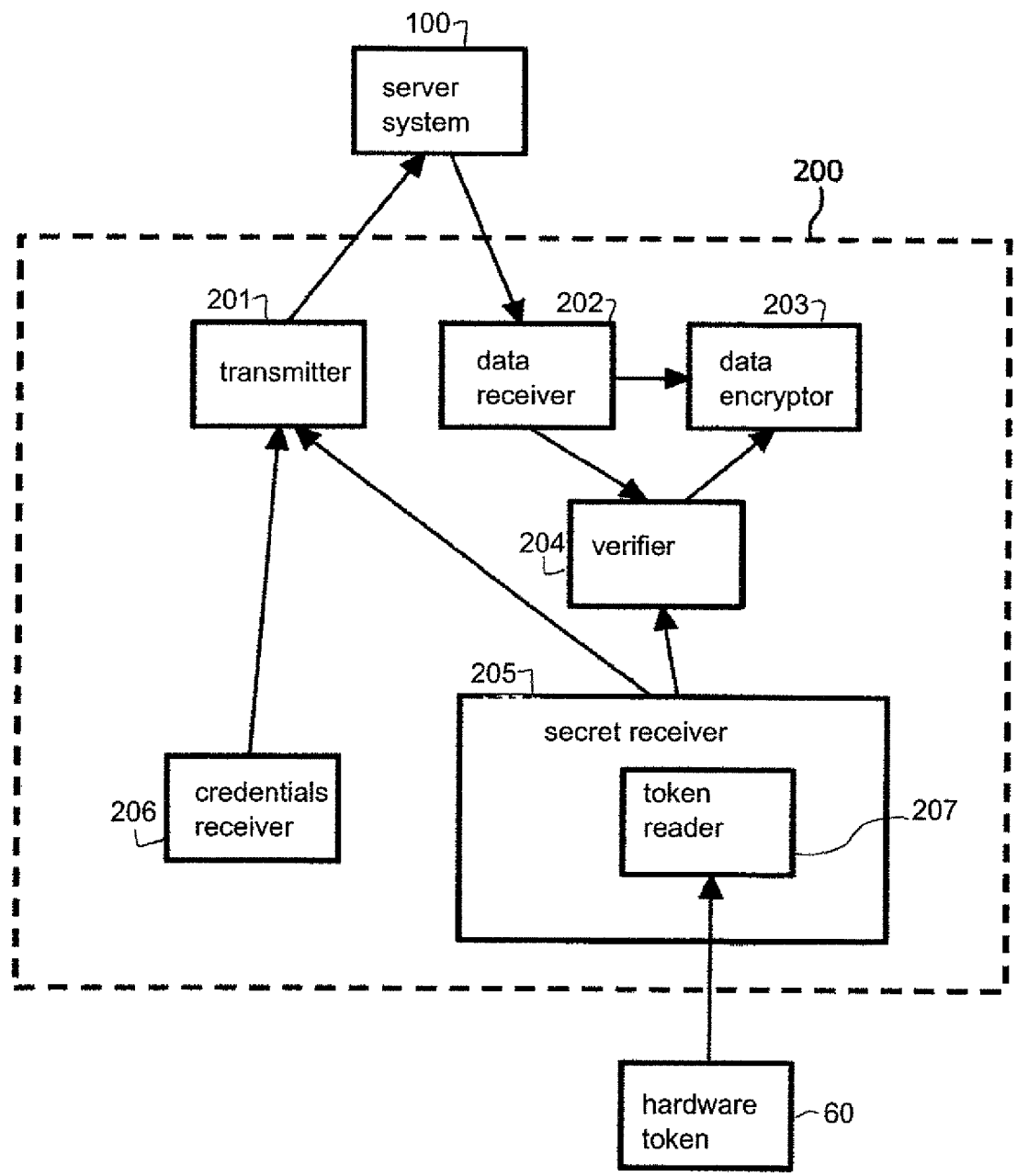
FIG. 2 is a block diagram of a user terminal for use in the system.

FIG. 2 illustrates a possible user terminal 200 for use with the server system 100. The terminal of FIG. 2 may be arranged to perform the task of the verifier of the hardware token. In this case, the hardware token does not need to perform the verification. Likewise, if the hardware token does have the verifier 62, a simpler terminal may be used without verifier 204. The terminal 200 may be implemented using PC hardware or may be implemented using different hardware, and suitable software. Similar objects have been indicated with similar reference numerals throughout the figures. The user terminal 200 may comprise a secret receiver 205 for receiving a representation of a secret revealed by a hardware token 60 and information identifying a data record corresponding to the hardware token 60. The user terminal 200 may further comprise a credentials receiver 206 for receiving authentication credentials of a user. The credentials receiver 206 may be based on user interface elements enabling the user to enter a user name and password, for example. Also, strong authentication of the user is possible using a combination of user name, password, and a hardware token associated with the user (as opposed to the hardware token 60 corresponding to the data record of the patient).

The user terminal 200 may further comprise a transmitter 201 for transmitting the authentication credentials of the user, the representation of the secret revealed by the hardware token 60, and information identifying the data record corresponding to the hardware token 60 to the server system 100. When the server system 100 grants access to the data record 2, based on the supplied information, the contents in the data record 2 may be sent to the user terminal 200 in an encrypted form. However, also an authentication of the server and/or a check of whether the correct data record 2 was found by the server system 100 may be performed as follows.

The user terminal 200 may comprise a data receiver 202 for receiving at least part of the contents of the data record in encrypted form and key data from the server system 100. The key data may be forwarded to a verifier 204 arranged for applying a hash function to the received key data (one or multiple times), and optional further processing steps, to obtain a processed key, and comparing the processed key to a value received for this purpose from the hardware token 60. The value may be based on a key further on in the hash sequence. Based on this comparison, the verifier 204 decides whether the server system 100 and/or the data record 2 are authentic.

The user terminal 200 may comprise a data decrypter 203 for decrypting the at least part of the contents of the data record, based on the key data. The data decrypter 203 may be configured for decrypting the data record's contents only if the authentication by the verifier 204 was successful.

The secret-receiving means 205 may comprise a token reader 207 for electronically obtaining the representation or the information from the hardware token 60. For example, the token reader 207 comprises a smart card reader and the hardware token 60 comprises a smart card.

A complete protected access system may be built using the server system, hardware tokens, and user terminals set forth, wherein the implementation of the verifier can be in the user terminal or in the hardware token.

Figure 3:
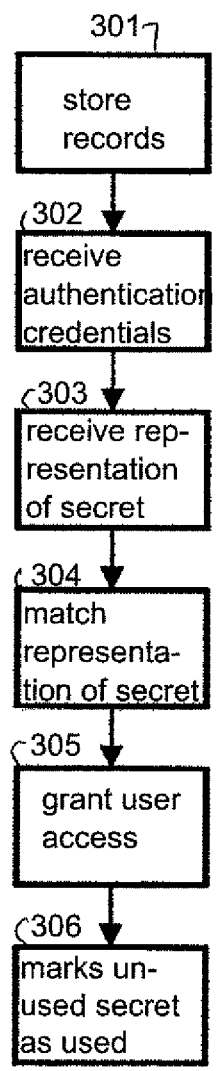
FIG. 3 is a flowchart of a method of providing secure access to a data record.

FIG. 3 illustrates a method of providing secure access to a data record. The method may be implemented in form of software which may be stored on one or more storage media, for distribution on a server system, one or more user terminals, and one or more hardware tokens.

The method may comprise step 301 of storing a plurality of data records, a data record having associated therewith a sequence of secrets shared with a hardware token corresponding to the data record, and storing user authentication information;

The method may comprise step 302 of receiving authentication credentials of a user from a user terminal and authenticating the user as an authorized user, based on the authentication credentials of the user and the stored authentication information.

The method may comprise step 303 of receiving a representation of a secret revealed by a hardware token and information identifying the data record corresponding to the hardware token from the terminal.

The method may comprise step 304 of matching the representation of the secret with an unused secret in the sequence of secrets associated with the data record corresponding to the hardware token.

The method may comprise step 305 of granting the user access to at least part of the data record corresponding to the hardware token if the representation of the secret matches the unused secret and the user has been authenticated as an authorized user.

The method may also comprise step 306 of marking the unused secret as used.

Use of a hardware token, such as a data-tag smart card (containing emergency redemption tokens) may enable the healthcare personnel to get access to the user's PHR in the event of emergency. As an example, the following features may be implemented.

The data-tag contains access information needed to access the health records.

The information on the card can be renewed without the need to destroy or invalidate your records.

The protocol involves a check on the medical credentials of the information requestor.

The protocol ensures that access to the record is only valid for one single session.

An exemplary embodiment may include one or more, or all, of the following elements:

PHR server sets up the association with the user by generating a hash chain and redemption tokens. The redemption tokens are encrypted and stored on the smart card, along with a pseudo secret.

The doctor can authenticate himself to the PHR Server, and his credentials should satisfy a policy defined by the PHR Server for enabling the emergency access.

The doctor, or the user terminal used by the doctor, generates a secret x locally and provides it to the PHR server along with the pseudo secret (ps) and $i^{th}$ redemption token ($rk_i$).

The emergency access is allowed only if the doctor is in possession of the user's smart card. Evidence thereof is produced by providing both the pseudo secret and the redemption token.

The scope of a particular redemption token is limited to the particular emergency session. For each emergency session, a different redemption token ($rk_i$) is used. The use of the $i^{th}$ redemption token enables access only for the $i^{th}$ emergency session and is not valid afterwards, even if the doctor tries to use it afterwards. Hence, this prevents the doctor from exploiting the emergency access to the user's PHR in the future and protects the user's privacy in an efficient way.

At the same time, the PHR server can initiate an automated phone call to the user to determine whether the user is currently in the emergency situation. If the user does not answer, it may be assumed that the user is indeed in an emergency situation.

After the validation of the redemption token and pseudo secret of the user (here: the person in need), the PHR server returns the $(i-1)^{th}$ key $K_{i-1}$ from the hash chain $K_1, K_2, \ldots, K_N$, in a secure authenticated channel, the secret is then used in combination with the doctor's own secret x to generate a one-time secret z for use to decrypt the user's PHR or subset of the PHR.

The PHR server returns the encrypted PHR encrypted with the key z, and access to the PHR can be limited in time. In this case, the user's original password or secret to access the PHR is not revealed to anyone.

Figure 4:
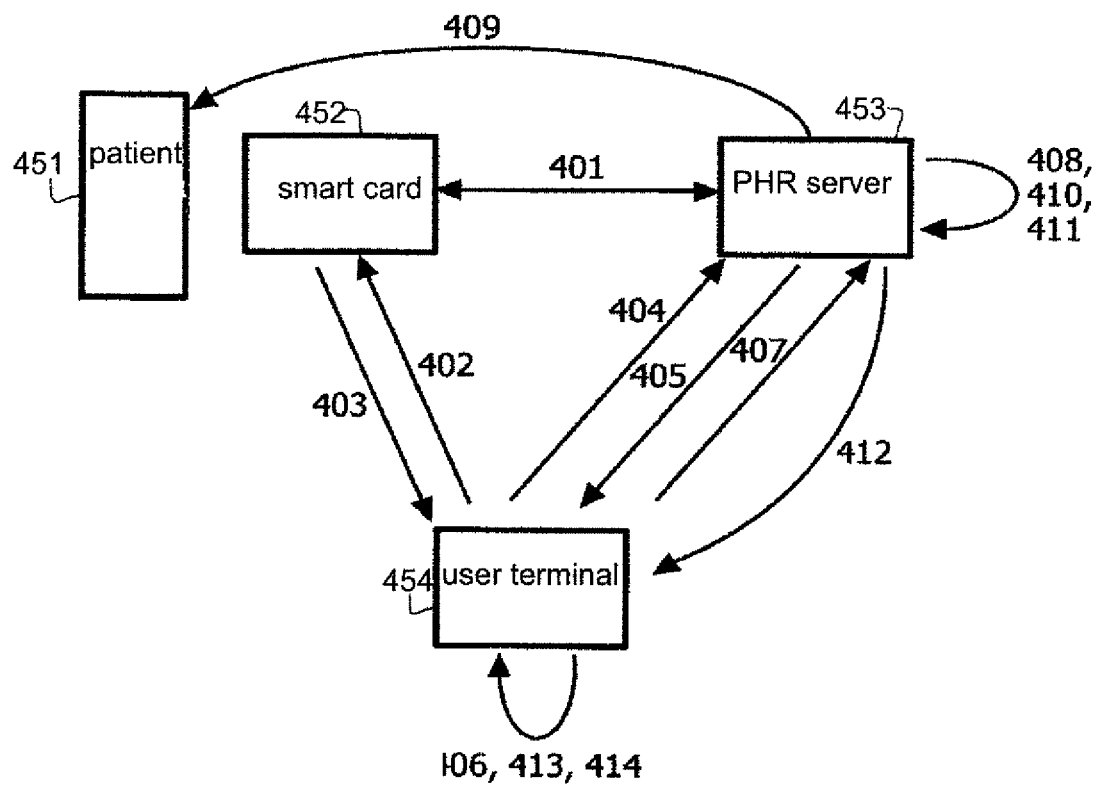
FIG. 4 is a diagram providing another view of a system for providing secure access to a data record.

FIG. 4 illustrates a more detailed example of an embodiment of the invention. These details are described here as mere examples, and may be applied separately or in combination to the systems of FIGS. 1 and 2 and the method of FIG. 3. The system shows illustratively a potential patient 451. The figure also shows a smart card 452, which is just an example of a hardware token. The figure further shows a PHR server 453 and a user terminal 454 (typically operated by a doctor). Numerals 401-414 indicate data flows associated with several processing steps.

A. Initialization of Secrets (step 401)

When the user signs up for a PHR account, he obtains a pseudo-secret from the PHR Server. The PHR server first chooses a random number $K_1$ as the first key of the hash chain [5]. A hash function is applied on the key to compute the next key on the chain. This process is repeated for n−1 times to generate a hash chain as follows:

$$K_1 \rightarrow K_2 = H[K_1] \rightarrow K_3 = H[K_2] \rightarrow \ldots \rightarrow K_n = H[K_{n-1}]$$

The hash chain has a one-way property in that, given $K_n$, it is computationally infeasible for an attacker to derive $K_{n-1}$. The hash chain is unique to each individual and it serves as an identifier for the PHR of the user. The key in the hash chain may be used to determine the authenticity of the user's PHR. The hash chain is used in reverse order and $K_n$ is denoted as the pseudo-secret of the user.

In addition to the hash chain, the PHR server generates n redemption tokens $X_1, \ldots, X_n$, for example random numbers, and they are encrypted with the keys of the hash chain in the following way:

$$E_{Kn-1}(X_n), E_{Kn-2}(X_{n-1}), \ldots, E_{k1}(X_2)$$

The redemption tokens are secrets shared between the user's hardware token and the PHR Server. The doctor who uses the redemption token is not able to decrypt the token, because of the encryption, hence preventing replay. As each token is encrypted with a key from the key chain and that the key is only known to the PHR Server, it is not possible for an attacker to create a new token or modify the token.

A data-tag, i.e. a hardware token, containing the pseudo-secret key, possibly in clear, an URL to access the PHR Server, and the encrypted redemption tokens are sent to the user with an accompanying letter in which he is advised to carry the data-tag with him or her at all times.

B. Triggering Emergency Access

In the event of emergency, the doctor and the PHR server may perform some or all of the following steps in order to release the PHR data to the doctor:

Step 402: The doctor queries the data on the data-tag smart card.

Step 403: The data-tag smart card returns the pseudo secret $K_n$ and the $i^{th}$ redemption token $rk_i = E_{Ki-1}(X_i)$. The pseudo-secret serves as the identifier of the user's PHR, while the redemption token grants emergency access to the doctor. The next time the doctor queries the smart card, a new redemption token will be issued i.e. $E_{ki-1}$), along with the pseudo secret $K_n$.

Step 404: The doctor authenticates to the PHR server, e.g., using his username and password, SAML token, PKI Certificate, etc.

Step 405: The PHR server authenticates the doctor and returns either authentication failure or successful message.

Step 406: Upon successful authentication, the doctor generates a random secret x locally.

Step 407: After generating the secret the doctor sends the pseudo secret (ps=$K_n$), redemption token ($rk_i=E_{ki-1}(X_i)$, and a random secret x to the PHR Server.

Step 408: Based on the pseudo-secret received, the PHR server locates the user's corresponding hash chain and advances the hash chain backward to obtain $K_{i-1}$. The redemption token is then decrypted using $K_{i-1}$ and the PHR Server ensures that the token has never been used before, otherwise the PHR server aborts the session and will not release the PHR data of the patient.

Step 409: the PHR Server could also make an automated phone call to the user to determine whether the user is in an emergency situation; the emergency access request will be immediately aborted if the user indicates otherwise.

Step 410: if the emergency situation has been ascertained, the PHR server generates a one-time secret key $z=x+K_{i-1}$, Step 411: The PHR server then uses the secret key z to encrypt the PHR of the user.

Step 412: The PHR server sends the encrypted PHR to the doctor, along with the key $K_{i-1}$ (e.g., the key can be sent as part of a key exchange protocol).

Step 413: The doctor's terminal, who also knows x and $K_{i-1}$, can compute the one-time secret z as well. However, prior to that, the doctor may ensure that $K_{i-1}$ received from the PHR Server is authentic and corresponds to the identity of the user, in order to ensure that the correct PHR is retrieved. The doctor's terminal can apply a hash function to $K_{i-1}$ and the resulting hash values repeatedly until it arrives at $K_n$ which may be regarded as a pseudo-secret of the user. This serves as a way to authenticate the PHR Server, as only the PHR Server knows the entire hash chain $H[K_{i-1}] \rightarrow \ldots \rightarrow H[K_{n-1}]=K_n$.

Step 414: the doctor decrypts the PHR data using the output of the step 413.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A server system for providing secure access to a data record, comprising
storage means for storing a plurality of data records, a data record having associated therewith a sequence of secrets shared with a hardware token corresponding to the data record, the server system further being arranged for storing user authentication information;
user authenticating means for receiving authentication credentials of a user from a user terminal and authenticating the user as an authorized user, based on the authentication credentials of the user and the stored authentication information;
secret-receiving means for receiving a representation of a secret revealed by a hardware token and information identifying the data record corresponding to the hardware token from the terminal, wherein the representation of the secret comprises an encryption of the secret ($s_3$), and the encryption is based on a key, and the key is part of a hash sequence;
matching means for matching the representation of the secret with an unused secret ($s_3$) in the sequence of secrets associated with the data record corresponding to the hardware token;

access granting means for granting the user access to at least part of the data record corresponding to the hardware token if the representation of the secret matches the unused secret ($s_3$) and the user has been authenticated as an authorized user; and marking means for marking the unused secret ($s_3$) as used.

2. The server system according to claim 1, wherein the server system comprises a communication means for making an automated telephone call or sending a message to a mobile phone or mobile terminal of a person associated with the hardware token before the access granting means grants the user access, and wherein the communication means is arranged for enabling the person to refuse granting the access.

3. The server system according to claim 1, comprising an encrypter for encrypting the at least part of the data record, using a key based on a value received from the user terminal, and a data transmission means for transmitting the encrypted data and information to compute the key from the value to the user terminal.

4. The server system according to claim 1, wherein the access granted to the at least one of the data records is limited in time.

5. The server system according to claim 1, wherein the position of the secret in the sequence of secrets corresponds to a position of the key in the hash sequence.

6. The server system according to claim 5, comprising data transmission means arranged for transmitting the key to the user terminal.

7. The server system according to claim 4, wherein the hardware token comprises secret-providing means for providing a representation of a secret, wherein the representation of the secret comprises an encryption of the secret, and the encryption is based on a key, and the key is part of a hash sequence, and the position of the secret in the sequence of secrets corresponds to a position of the key in the hash sequence, and the secret providing means is arranged for providing the representations in reverse sequential order.

8. The server system according to claim 7, comprising a verifier arranged for receiving the key with which the encryption of the secret was generated to obtain a received key, applying a hash function to the received key to obtain a processed key, and comparing the processed key to a stored value.

9. A system comprising the server system according to claim 1, wherein a user terminal comprises
   a secret receiver for receiving a representation of a secret revealed by a hardware token and information identifying a data record corresponding to the hardware token;
   a credentials receiver for receiving authentication credentials of a user;
   a transmitter for transmitting the authentication credentials of the user, the representation of the secret revealed by the hardware token, and information identifying the data record corresponding to the hardware token to the server system; and
   a data receiver for receiving at least part of the contents of the data record in encrypted form and key data from the server system;
   a verifier arranged for applying a hash function to the received key data to obtain a processed key, and comparing the processed key to a value received from the hardware token;
   a data decrypter for decrypting the at least part of the contents of the data record, based on the key data.

10. The system according to claim 9, wherein the secret receiver of the user terminal comprises a token reader for electronically obtaining the representation or the information from the hardware token.

11. The system according to claim 9, wherein the position of the secret in the sequence of secrets corresponds to a position of the key in the hash sequence.

12. A method of providing secure access to a data record, comprising
   storing a plurality of data records, a data record having associated therewith a sequence of secrets shared with a hardware token corresponding to the data record, and storing user authentication information;
   receiving authentication credentials of a user from a user terminal and authenticating the user as an authorized user, based on the authentication credentials of the user and the stored authentication information;
   receiving a representation of a secret revealed by a hardware token and information identifying the data record corresponding to the hardware token from the terminal, wherein the representation of the secret comprises an encryption of the secret ($s_3$), and the encryption is based on a key, and the key is part of a hash sequence;
   matching the representation of the secret with an unused secret in the sequence of secrets associated with the data record corresponding to the hardware token,
   granting the user access to at least part of the data record corresponding to the hardware token if the representation of the secret matches the unused secret and the user has been authenticated as an authorized user; and
   marking the unused secret as used.

13. A non-transitory computer readable medium encoded with a program product comprising instructions, which, when executed by a processor causes the processor to perform the method according to claim 12.

14. A method, comprising
   querying data on a data-tag smart card;
   receiving a pseudo secret and a redemption token from the data-tag smart card, wherein the pseudo-secret is an identifier of a health record;
   authenticating the health record and a source of the query;
   generating a random secret locally;
   transmitting the pseudo secret, the redemption token, and the random secret to a health record server;
   locating a corresponding hash chain and advancing the hash chain backward to obtain a second key;
   decrypting the redemption token using the second key;
   granting a one-time secret key in response to an emergency situation;
   employing the one-time secret key to encrypt the health record;
   sending the encrypted health record and the second key;
   computing a second one-time secret;
   decrypting the health record data using the second one-time secret; and
   accessing the information in the decrypted health record.

15. The method according to claim 14, wherein the redemption token grants emergency access.

16. The method according to claim 14, wherein the redemption token is different for every query.

17. The method according to claim 14, wherein the health record is authenticated by a username, a password, a token and a certificate.

18. The method according to claim 14, further comprising:
   determining if the redemption token has been used before, where the health record is not released if the redemption token has been used before.

19. The method according to claim 14, further comprising:
invoking an automated phone call to determine a user is in the emergency situation.

20. The method according to claim 14, further comprising:
authenticating the random secret and the second key.

\* \* \* \* \*